United States Patent [19]

Marczinke et al.

[11] Patent Number: 5,466,753
[45] Date of Patent: Nov. 14, 1995

[54] PROPYLENE COPOLYMERS GRAFTED WITH MONOMALEIMIDES

[75] Inventors: Bernd L. Marczinke, Speyer; Hans-Joachim Müller, Grünstadt, both of Germany

[73] Assignee: BASF Aktiengesellschaft, Ludwigshafen, Germany

[21] Appl. No.: 309,442

[22] Filed: Sep. 20, 1994

[30] Foreign Application Priority Data

Sep. 25, 1993 [DE] Germany .......................... 43 32 734.6
Oct. 2, 1993 [DE] Germany .......................... 43 33 670.1

[51] Int. Cl.$^6$ ........................................ C08F 8/00
[52] U.S. Cl. ............................ 525/193; 525/240; 525/282
[58] Field of Search ........................... 525/193, 240

[56] References Cited

U.S. PATENT DOCUMENTS

| | | | |
|---|---|---|---|
| 4,818,785 | 4/1989 | Otawa et al. | 525/193 |
| 5,032,459 | 7/1991 | Toyoshima et al. | 525/193 |
| 5,296,552 | 3/1994 | Ohmae et al. | 525/193 |

FOREIGN PATENT DOCUMENTS

| | | |
|---|---|---|
| 363870 | 4/1990 | European Pat. Off. . |
| 1920692 | 4/1969 | Germany . |

OTHER PUBLICATIONS

U.S. Ser. No. 07/725,870, BASF Aktiengesellschaft.
Database WPI, AN 87–337827 (English abstract of JP–A 62241913–Oct. 22, 1987).

*Primary Examiner*—Bernard Lipman
*Attorney, Agent, or Firm*—Keil & Weinkauf

[57] ABSTRACT

Grafted propylene copolymers having a melt flow index of from 0.1 to 100 g/10 min, at 230° C. and under a weight of 2.16 kg, comprising $a_1$) a polymer comprising from 25 to 97% by weight of a propylene copolymer (I), which contains from 0.1 to 15% by weight of copolymerized $C_2$-$C_{10}$-alk-1-enes, and from 3 to 75% by weight of a further propylene copolymer (II) which contains from 15 to 80% by weight of copolymerized $C_2$-$C_{10}$-alk-1-enes, or comprising $a_2$) a polymer comprising from 25 to 97% by weight of a propylene homopolymer and from 3 to 75% by weight of a propylene copolymer containing copolymerized $C_2$-$C_{10}$-alk-1-enes, the comonomer content being from 15 to 80% by weight, based on the latter component, and b) a monomaleimide compound of the following formula (I)

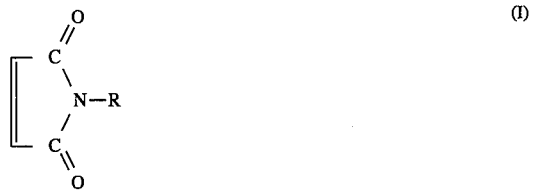

where R has the following meanings:

$C_1$-$C_{10}$-alkyl, it being possible for the alkyl radical to be interrupted by one or more oxygen atoms, $C_5$-$C_{10}$-cycloalkyl, $C_6$-$C_{12}$-aryl, $C_7$-$C_{18}$-aralkyl, and a radical of the following formula (II)

$$R^1\text{-}X \qquad (II)$$

where $R^1$ is a $C_1$-$C_{10}$-alkyl radical and X is one of the following functional groups:

-COOH, -COOR$^2$, OH, OR$^3$, NH$_2$, NHR$^4$, NR$^5$R$^6$, and where the radicals $R^2$, $R^3$, $R^4$, $R^5$ and $R^6$ in each case are $C_1$-$C_{10}$-alkyl groups, obtainable by reacting the polymer $a_1$) or $a_2$) with the monomaleimide compound b) at from 180° to 280° C. and from 1 to 100 bar and with average residence times of the reaction mixture of from 0.2 to 10 minutes.

9 Claims, No Drawings

PROPYLENE COPOLYMERS GRAFTED WITH MONOMALEIMIDES

The present invention relates to propylene copolymers grafted with monomaleimides and having a melt flow index of from 0.1 to 100 g/10 min, at 230° C. and under a weight of 2.16 kg, comprising $a_1$) a polymer comprising from 25 to 97% by weight of a propylene copolymer (I), which contains from 0.1 to 15% by weight of copolymerized $C_2$-$C_{10}$-alk-1-enes, and from 3 to 75% by weight of a further propylene copolymer (II) which contains from 15 to 80% by weight of copolymerized $C_2$-$C_{10}$-alk-1-enes, or comprising $a_2$) a polymer comprising from 25 to 97% by weight of a propylene homopolymer and from 3 to 75% by weight of a propylene copolymer containing copolymerized $C_2$-$C_{10}$-alk-1-enes, the comonomer content being from 15 to 80% by weight, based on the latter component, and b) a monomaleimide compound of the following formula (I)

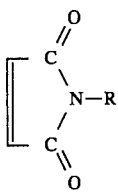

where R has the following meanings:
$C_1$-$C_{10}$-alkyl, it being possible for the alkyl radical to be interrupted by one or more oxygen atoms, $C_5$-$C_{10}$-cycloalkyl, $C_6$-$C_{12}$-aryl, $C_7$-$C_{18}$-aralkyl, and a radical of the following formula (II)

$$R^1\text{-}X \qquad \text{(II)}$$

where $R^1$ is a $C_1$-$C_{10}$-alkyl radical and X is one of the following functional groups:
-COOH, -COOR², OH, OR³, NH₂, NHR⁴, NR⁵R⁶,
and where the radicals $R^2$, $R^3$, $R^4$, $R^5$ and $R^6$ in each case are $C_1$-$C_{10}$-alkyl groups, obtainable by reacting the polymer $a_1$) or $a_2$) with the monomaleimide compound b) at from 180° to 280° C. and from 1 to 100 bar and with average residence times of the reaction mixture of from 0.2 to 10 minutes.

The present invention additionally relates to a process for preparing these grafted propylene polymers and to films, fibers and molded articles made from these grafted propylene polymers.

The grafting of propylene polymers with the aid of unsaturated carboxylic acid derivatives, for example maleic acid derivatives, has already been known for some time (DE-A 3 901 606). Graft reactions of this type can be carried out in the presence of initiators which dissociate to give free radicals, a severe molecular weight reduction frequently occurring in the grafted propylene polymers obtained, however, which impairs the mechanical properties of these polymers (J. Appl. Poly. Sci., Vol. 32, 1986, 5431–5437). It is furthermore a disadvantage in preparation processes of this type for grafted propylene polymers that the graft reaction has to be carried out with the aid of initiators which dissociate to give free radicals, such as, for example, organic peroxides or azo compounds, as these compounds are often explosive and for occupational hygiene reasons cannot be employed without hesitation.

DE-A 4 022 570 describes the grafting of propylene copolymers with the aid of unsaturated carboxylic acids or carboxylic acid derivatives, it being possible to carry out the graft reaction in the absence of initiators which dissociate to give free radicals. Particularly suitable carboxylic acids here are especially maleic acid, fumaric acid, acrylic acid, crotonic acid, itaconic acid or their anhydrides.

It is disadvantageous in the process described in DE-A 4 022 570, however, that high graft yields of more than 80% can only be achieved with relatively modest concentrations of the unsaturated carboxylic acids or their derivatives. As a result, the cost-effectiveness of the graft process is reduced. Furthermore, the graft comonomers employed here are often volatile. For this reason, under certain circumstances difficulties can occur with respect to adherence to toxicological safety conditions in the further processing of the grafted propylene copolymers as a result of unreacted graft comonomers.

It is an object of the present invention to remedy the disadvantages described, and to develop novel grafted polymers which contain fewer volatile comonomers and can be obtained by a process in which it is possible to incorporate even greater concentrations of the comonomers to be grafted into the polymers with high graft yields.

We have now found that this object is achieved by the propylene copolymers grafted with monomaleimides defined at the beginning.

The grafted propylene copolymers according to the invention have a melt flow index of from 0.1 to 100 g/10 min, at 230° C. and under a weight of 2.16 kg. The melt flow index here corresponds to the amount of polymer which is squeezed out in the course of 10 minutes from the test apparatus standardized in accordance with DIN 53 735 at 230° C. and under a weight of 2.16 kg. Particularly preferred grafted propylene copolymers here are those whose melt flow index is from 0.1 to 50 g/10 min, at 230° C. and under a weight of 2.16 kg.

The grafted propylene copolymers according to the invention may, on the one hand, contain a polymer $a_1$) which comprises from 25 to 97% by weight of a propylene copolymer (I), which contains from 0.1 to 15% by weight of copolymerized $C_2$-$C_{10}$-alk-1-enes, and from 3 to 75% by weight of a further propylene copolymer (II), the latter containing from 15 to 80% by weight of copolymerized $C_2$-$C_{10}$-alk-1-enes. Grafted propylene copolymers are preferred here whose polymer $a_1$) contains from 35 to 95% by weight of a propylene copolymer (I), containing from 0.2 to 12% by weight of copolymerized $C_2$-$C_{10}$-alk-1-enes, and from 5 to 65% by weight of a propylene copolymer (II) containing from 20 to 75% by weight of copolymerized $C_2$-$C_{10}$-alk-1-enes. Among these grafted propylene copolymers, those are particularly preferably employed whose polymer $a_1$) consists of from 40 to 93% by weight of a propylene copolymer (I) containing from 0.3 to 9% by weight of copolymerized $C_2$-$C_{10}$-alk-1-enes and of from 7 to 60% by weight of a propylene copolymer (II) containing from 25 to 70% by weight of copolymerized $C_2$-$C_{10}$-alk-1-enes.

Copolymerized $C_2$-$C_{10}$-alk-1-enes are understood in this connection as meaning in particular ethylene, but-1-ene, pent-1-ene, hex-1-ene, hept-1-ene or oct-1-ene or mixtures of these comonomers, ethylene or but-1-ene being preferably employed.

The preparation of the polymer $a_1$) to be used according to the invention can be carried out either batchwise or, preferably, continuously in the customary reactors used for the polymerization of propylene. Suitable reactors are, inter alia, continuously operated stirring vessels, it also being possible to employ a series of several stirring vessels connected one after the other. The reactors contain a solid bed of finely divided polymer, which is customarily kept in motion by stirring.

The process can be carried out either in the gas phase or in a suspension or a solution using the Ziegler-Natta catalysts customary in polymerization technology. In addition to a titanium-containing solid component, these contain, inter alia, cocatalysts. Possible cocatalysts here are aluminum compounds together with electron donor compounds.

For preparing the titanium-containing solid component, halides or alkoxides of tri- or tetravalent titanium are in general used as titanium compounds, the chlorides of titanium, in particular titanium tetrachloride, being preferred. Advantageously, the titanium-containing solid component contains a finely divided carrier, for which silicon oxides and aluminum oxides, and also aluminum silicates of the empirical formula $SiO_2.aAl_2O_3$, where a is a value from 0.001 to 2, in particular from 0.01 to 0.5, have proven well-suited.

The preferred carriers used have a particle diameter of from 0.1 to 1000 μm, in particular from 10 to 300 μm, a pore volume of from 0.1 to 10 cm³/g, in particular from 1.0 to 5.0 cm³/g, and a specific surface area of from 10 to 1000 m²/g, in particular from 100 to 500 m²/g.

Compounds of magnesium, inter alia, are further employed in the preparation of the titanium-containing solid component. Those suitable are, in particular, magnesium halides, magnesium alkyls and magnesium aryls, and also alkoxymagnesium and aryloxymagnesium compounds, magnesium dichloride, magnesium dibromide and magnesium di($C_1$-$C_{10}$-alkyl) compounds being preferably used. In addition, the titanium-containing solid component can also contain halogen, preferably chlorine or bromine.

As a rule, the titanium-containing solid component additionally contains electron donor compounds, for example mono-or polyfunctional carboxylic acids, carboxylic anhydrides and carboxylic acid esters, ketones, ethers, alcohols, lactones and also organophosphorus and organosilicon compounds. Phthalic acid derivatives of the general formula (III)

 (III)

are preferably employed as electron donor compounds within the titanium-containing solid component, X and Y in each case being chlorine or a $C_1$- to $C_{10}$-alkoxy radical or together being oxygen. Particularly preferred electron donor compounds are phthalic esters, X and Y being $C_1$-$C_8$-alkoxy radicals, for example methoxy, ethoxy, propyloxy or butyloxy radicals.

Other preferred electron donor compounds within the titanium-containing solid component are, inter alia, diesters of 3- or 4-membered, unsubstituted or substituted cycloalkyl-1,2-dicarboxylic acids, and also monoesters of unsubstituted or substituted benzophenone-2-carboxylic acids. The hydroxy compounds used in these esters are the alcohols customary in esterification reactions, inter alia $C_1$- to $C_{15}$-alkanols and $C_5$- to $C_7$-cycloalkanols, which for their part can carry $C_1$- to $C_{10}$-alkyl groups, and also phenols, naphthols and the $C_1$-$C_{10}$-alkyl derivatives of these compounds.

The titanium-containing solid component can be prepared by methods known per se. Examples of these are described, inter alia, in EP-A 45 975, EP-A 86 473, EP-A 171 200, GB-A 2 111 066 and US-A 4 857 613.

The three-stage process below is preferably used for the preparation of the titanium-containing solid component.

In the first stage, a finely divided carrier, preferably silicon dioxide or $SiO_2.aAl_2O_3$ having a water content of from 0.5 to 5% by weight, a being a number in the range from 0.001 to 2, in particular in the range from 0.01 to 0.5, is first treated with a solution of the magnesium-containing compound in a liquid alkane, after which this mixture is stirred for from 0.5 to 5 hours at from 10° to 120° C.

Preferably, from 0.1 to 1 mol of the magnesium compound is employed per mole of the carrier. A halogen or a hydrogen halide, in particular chlorine or hydrogen chloride, is then added with continuous stirring in an at least two-fold, preferably in an at least five-fold, molar excess, based on the magnesium-containing compound. After from about 30 to 120 minutes, the solid is separated off from the liquid phase.

In the second stage, the product obtained in this manner is introduced into a liquid alkane, and a $C_1$- to $C_8$-alkanol, in particular ethanol, a halide or an alkoxide of tri- or tetravalent titanium, in particular titanium tetrachloride, and an electron donor compound, in particular a phthalic acid derivative of the general formula (III), are then added. From 1 to 5 mol, in particular from 2 to 4 mol, of alkanol, from 2 to 20 mol, in particular from 4 to 10 mol, of tri- or tetravalent titanium and from 0.01 to 1 mol, in particular from 0.1 to 1.0 mol, of the electron donor compound are employed here per mole of magnesium of the solid obtained from the first stage. This mixture is stirred for at least one hour at from 10° to 150° C., and the solid substance thus obtained is then filtered off and washed with a liquid alkane, preferably with hexane or heptane.

In the third stage, the solid obtained from the second stage is extracted for a few hours at from 100° to 150° C. with excess titanium tetrachloride or an excess of a solution of titanium tetrachloride in an inert solvent, preferably an alkylbenzene, the solvent containing at least 5% by weight of titanium tetrachloride. The product is then washed with a liquid alkane until the content of titanium tetrachloride in the wash liquid is less than 2% by weight.

The titanium-containing solid component obtainable in this manner is used with cocatalysts as the Ziegler-Natta catalyst system. Suitable cocatalysts here are aluminum compounds and electron donor compounds.

In addition to trialkylaluminum, suitable aluminum compounds are also those compounds in which an alkyl group is replaced by an alkoxy group or by a halogen atom, for example by chlorine or bromine.

Trialkylaluminum compounds are preferably used whose alkyl groups in each case contain 1 to 8 C atoms, for example trimethyl-, triethyl- or methyldiethylaluminum.

In addition to the aluminum compound, electron donor compounds such as, for example, mono- or polyfunctional carboxylic acids, carboxylic anhydrides and carboxylic acid esters, ketones, ethers, alcohols, lactones, and also organophosphorus and organosilicon compounds are preferably additionally used as a further cocatalyst. Particularly suitable electron donor compounds here are organosilicon compounds of the general formula (IV)

 (IV)

where $R^7$ is identical or different and is a $C_1$- to $C_{20}$-alkyl group, a 5- to 7-membered cycloalkyl group which, for its part, can carry a $C_1$- to $C_{10}$-alkyl group, or is a $C_6$- to $C_{20}$-aryl or arylalkyl group, $R^8$ is identical or different and is a $C_1$- to $C_{20}$-alkyl group and n is the number 1, 2 or 3. Particularly preferred compounds here are those in which $R^7$ is a $C_1$- to $C_8$-alkyl group or a 5- to 7-membered cycloalkyl group, $R^8$ is a $C_1$- to $C_4$-alkyl group and n is the number 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are to be emphasized.

Those catalyst systems are preferably used in which the atomic ratio between aluminum from the aluminum compound and titanium from the titanium-containing solid component is from 1:1 to 800:1, in particular from 2:1 to 200:1, and the molar ratio between the aluminum compound and the electron donor compound employed as a cocatalyst is from 1:1 to 100:1, in particular from 2:1 to 80:1. The catalyst constituents can be introduced into the polymerization system in any desired sequence individually or as a mixture of the components.

With the aid of catalyst systems of this type, the polymers $a_1$) contained in the grafted propylene copolymers according to the invention can be prepared. According to a preferred two-stage process, the propylene copolymer (I) is initially prepared in a first polymerization stage and the propylene copolymer (II) is prepared subsequently to this in a second polymerization stage onto propylene.

The copolymerization of the propylene and the corresponding $C_2$-$C_{10}$-alk-1-enes is customarily carried out in the first polymerization stage at from 20 to 40 bar, from 60° to 90° C. and with an average residence time of the reaction mixture of from 1 to 5 hours. Pressures of from 25 to 35 bar, temperatures of from 65° to 85° C. and average residence times of from 1.5 to 4 hours are preferred in the preparation of the propylene copolymer (I). The reaction conditions are preferably selected here such that from 0.05 to 2 kg of propylene copolymer (I) are formed per mmol of the aluminum component in this first polymerization stage. The $C_2$-$C_{10}$-alk-1-ene used here is in particular ethylene or but-1-ene, or a mixture of these comonomers. For preparing the propylene copolymer (I), the propylene is copolymerized with the comonomers such that the ratio between the partial pressure of the propylene and that of the comonomers is set at from 10:1 to 1000:1, in particular at from 15:1 to 500:1.

After completion of the reaction, the propylene copolymer (I) formed in this process is removed from the first polymerization stage together with the catalyst and introduced into the second polymerization stage, where the propylene copolymer (II) is prepared.

This is carried out in the second polymerization stage by polymerizing propylene together with one or more $C_2$-$C_{10}$-alk-1-enes at from 5 to 25 bar, from 30° to 80° C. and with average residence times of the reaction mixture of from 1 to 5 hours in the presence of the propylene copolymer (I). Pressures of from 10 to 20 bar, temperatures of from 40° to 70° C. and average residence times of from 1.5 to 4 hours are preferred here. Customarily, the pressures in the second polymerization stage are around at least 7 bar, preferably around at least 10 bar, below those in the first polymerization stage. $C_2$-$C_{10}$-alk-1-enes employed here are in particular ethylene and but-1-ene, or a mixture of these comonomers. For preparing the copolymer (II), the propylene is copolymerized with the comonomers such that the ratio between the partial pressure of the propylene and that of the comonomers is set at from 0.1:1 to 20:1, in particular at from 0.2:1 to 15:1. By means of suitable choice of the polymerization parameters, account should additionally be taken of the fact that the weight ratio between the monomers reacted in the first and in the second polymerization stages is from 0.5:1 to 20:1, in particular from 0.6:1 to 10:1.

The melt flow indices of the polymers $a_1$) obtainable in this manner are in the range from 0.1 to 100 g/10 min, in particular in the range from 0.5 to 50 g/10 min, at 230° C. and 2.16 kg, in accordance with DIN 53 735. The melt flow index corresponds here to that amount of polymer which is discharged at 230° C., and under a weight of 2.16 kg from the test device standardized in accordance with DIN 53 735.

Furthermore, the grafted propylene polymers according to the invention may contain a polymer $a_2$) comprising from 25 to 97% by weight of a propylene homopolymer and from 3 to 75% by weight of a propylene copolymer containing copolymerized $C_2$-$C_{10}$-alk-1-enes, the comonomer content being from 15 to 80% by weight, based on the latter component. Grafted propylene polymers are preferred here whose polymer $a_2$) consists of from 35 to 95% by weight of a propylene homopolymer and from 5 to 65% by weight of a propylene copolymer, the comonomer content being from 20 to 75% by weight, based on the latter component. Particularly preferred grafted propylene polymers contain a polymer $a_2$) comprising from 40 to 93% by weight of a propylene homopolymer and from 7 to 60% by weight of a propylene copolymer. In this case, the comonomer content is from 20 to 70% by weight, based on the latter component. Copolymerized $C_2$-$C_{10}$-alk-1-enes are understood in this connection as meaning in particular ethylene, but-1-ene, pent-1-ene, hex-1-ene, hept-1-ene or oct-1-ene or mixtures of these comonomers, ethylene or but-1-ene being preferably employed.

The preparation of the polymer $a_2$) to be used according to the invention can be carried out either batchwise or, preferably, continuously in the customary reactors used for the polymerization of propylene.

As far as the reactors and reaction conditions employed here and the Ziegla-Natta catalysts used here are concerned, reference should be made to the preparation of the polymers $a_1$), which is similar in this respect.

In a preferred preparation process for the polymers $a_2$), the propylene is polymerized in a first polymerization stage and in a second polymerization stage a mixture of propylene and one or more $C_2$-$C_{10}$-alk-1-enes are polymerized onto the propylene homopolymer obtained therefrom.

The polymerization of the propylene is carried out in the first polymerization stage at from 20 to 40 bar, from 60° to 90° C. and with an average residence time of the reaction mixture of from 1 to 5 hours. Pressures of from 20 to 35 bar, temperatures of from 65° to 85° C. and average residence times of from 1.5 to 4 hours are preferred here. The reaction conditions are preferably selected such that from 0.05 to 2 kg, preferably from 0.1 to 1.5 kg, of propylene homopolymer are formed per mmol of the aluminum component in the first polymerization stage. For regulating the molar mass, the regulators customary in the polymerization of alk-1-enes, for example hydrogen, can additionally be used.

After completion of the reaction, this propylene homopolymer is removed from the first polymerization stage with the catalyst and introduced into the second polymerization stage, where a mixture of propylene and one or more $C_2$-$C_{10}$-alk-1-enes is polymerized onto it. The pressure in the second polymerization stage is 7 bar, preferably 10 bar, below that of the first polymerization stage and is from 5 to 30 bar, preferably from 10 to 25 bar. The temperature is from 30° to 100° C., preferably from 35° to 80° C., and the average residence time of the polymer is from 1 to 5 hours, preferably from 1.5 to 4 hours. In this second polymerization stage, the ratio of the partial pressures between propylene and the copolymerized $C_2$-$C_{10}$-alk-1-enes is adjusted to from 0.1:1 to 10:1. By means of suitable choice of the reaction parameters, account should further be taken of the fact that the weight ratio between the monomers reacted in the first and in the second polymerization stages is from 0.2:1 to 20:1, in particular from 0.4:1 to 15:1.

The melt flow indices of the polymers $a_2$) obtainable in this manner are in the range from 0.1 to 100 g/10 min, in particular in the range from 0.5 to 50 g/min, at 230° C. and 2.16 kg, in accordance with DIN 53 735.

The grafted propylene copolymers according to the invention furthermore contain a monomaleimide compound b) of the following formula (I)

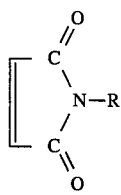

where R has the following meanings:

$C_1$-$C_{10}$-alkyl, it being possible for the alkyl radical to be interrupted by one or more oxygen atoms, $C_5$-$C_{10}$-cycloalkyl, $C_6$-$C_{12}$-aryl, $C_7$-$C_{18}$-aralkyl, or a radical of the following formula (II)

$$R^1\text{-}X \qquad (II)$$

where $R^1$ is a $C_1$-$C_{10}$-alkyl radical and X is one of the following functional groups:

-COOH, -COOR$^2$, OH, OR$^3$, NH$_2$, NHR$^4$, NR$^5$R$^6$, and where the radicals $R^2$, $R^3$, $R^4$, $R^5$ and $R^6$ in each case are $C_1$-$C_{10}$-alkyl groups.

Preferred monomaleimide compounds here are those of the formula (I), where R has the following meanings:

$C_1$-$C_8$-alkyl, $C_5$-$C_7$-cycloalkyl, $C_6$-$C_{10}$-aryl, $C_7$-$C_{12}$-aralkyl, and a radical of the formula (II), $R^1$ being a $C_1$-$C_{10}$-alkyl radical and X being one of the following functional groups:

-COOH, -COOR$^2$, OH, OR$^3$, NH$_2$, NHR$^4$, NR$^5$R$^6$, and the radicals $R^2$, $R^3$, $R^4$, $R^5$ and $R^6$ being $C_1$-$C_{10}$-alkyl groups.

Among these monomaleimide compounds b), 4-maleimidobenzoic acid, N,N'-dimethylamino-4-maleimidobenzene and p-hydroxyphenylmaleimide are in particular to be emphasized.

The monomaleimide compounds b) can be prepared, for example, by reacting maleic anhydride with the appropriate monoamines and then with acetic acid and sodium acetate. Preparation processes of this type are known to the person skilled in the art.

The grafted propylene copolymers according to the invention are obtainable by reaction of the polymer $a_1$) or $a_2$) with the monomaleimide compound b) at from 180° to 280° C. and from 1 to 100 bar and with average residence times of the reaction mixture of from 0.2 to 10 minutes. Temperatures of from 190° to 260° C., pressures of from 1 to 50 bar and average residence times of from 0.2 to 5 minutes are preferred here. The grafting of the propylene copolymers is carried out in the apparatuses customarily employed in plastics processing for the combination of substances, for example in drum mixers, in mills, in screw or disk extruders, or in roll mills or kneaders.

For preparing the grafted propylene copolymers according to the invention, from 0.001 to 5 parts by weight of the monomaleimide compound b) are advantageously used per 100 parts by weight of the polymer $a_1$) or $a_2$). Preferably, from 0.01 to 2 parts by weight and, in particular, from 0.05 to 1.0 parts by weight of the monomaleimide compound b) are employed per 100 parts by weight of the polymer $a_1$) or $a_2$). The monomaleimide compound b) here is grafted onto the polymer $a_1$) or $a_2$).

In a particularly preferred preparation process, appropriate amounts of the monomaleimide compound b) are added to the polymer $a_1$) or $a_2$) immediately after its preparation in a mixing apparatus attached to the preparation reactor. An extruder is preferably used as the mixing apparatus here. After completion of the reaction, the grafted propylene copolymer is removed from the mixing apparatus and separated from volatile starting materials in a tunnel drier attached thereto. The grafted propylene copolymer obtained in this manner can be further processed directly.

As a result of the choice of the specific polymers $a_1$) or $a_2$) and of the monomaleimide compounds b), grafted propylene copolymers are obtained having good mechanical properties, in particular a good adhesion to polar substances such as glass or metals. The grafted propylene copolymers according to the invention can be easily processed and contain virtually no volatile substances.

An advantage of the process used for their preparation is in particular that the grafting can be carried out in the absence of an initiator which dissociates to give free radicals. The process, likewise according to the invention, for preparing the grafted propylene copolymers is also distinguished in particular by a high graft yield even at relatively low concentrations of the comonomer to be grafted.

The grafted propylene copolymers according to the invention are particularly suitable for the production of films, fibers and molded articles.

EXAMPLES

Example 1

100 parts by weight of a polymer $a_1$) comprising 54.3% by weight of a propylene-ethylene copolymer (I), containing 2.5% by weight of copolymerized ethylene, and 45.7% by weight of a propylene-ethylene copolymer (II) containing 60% by weight of copolymerized ethylene and having a melt flow index of 1.0 g/10 min, at 230° C. and 2.16 kg, in accordance with DIN 53 735, were reacted with 4-maleimidobenzoic acid in a ZSK 40 double screw extruder. The respective proportions of the copolymers (I) and (II) were determined by extraction fractionation according to W. Holtrup, Makromolekulare Chemie, 178, [1977], 2335, the ethylene contents by Fourier transformation spectroscopy.

The reaction was carried out at 240° C., 0.1 bar and with an average residence time of 2 minutes. The respective amounts of 4-maleimidobenzoic acid used are shown in the table below.

The grafted propylene polymers obtained here are colorless and odorless and, compared with the polymer $a_1$) employed, have nearly unchanged fluidities. The grafted propylene polymers were then reprecipitated from a mixture of ethylbenzene and methanol. In the case of graft copolymers containing acidic groups, the graft yield was determined by titration with potassium hydroxide solution in xylene, otherwise by infrared spectroscopy.

TABLE 1

| Amount of 4-maleimidobenzoic acid employed [parts by weight] | Graft yield [%] | Melt flow index* [g/10 min] |
| --- | --- | --- |
| 0 | — | 1.3 |
| 0.2 | 98 | 1.2 |
| 0.4 | 90 | 1.2 |

TABLE 1-continued

| Amount of 4-maleimidobenzoic acid employed [parts by weight] | Graft yield [%] | Melt flow index* [g/10 min] |
|---|---|---|
| 0.6 | 85 | 1.3 |
| 1.0 | 70 | 1.2 |

*at 230° C. and 2.16 kg, in accordance with DIN 53 735

Comparison Example A 100 parts by weight of the polymer $a_1$) employed in Example 1 were grafted under similar conditions, the corresponding amount of maleic anhydride being used instead of 4-maleimidobenzoic acid. The grafted propylene polymers were worked up and measured in a similar manner to Example 1.

TABLE 2

| Amount of maleic anhydride employed [parts by weight] | Graft yield [%] | Melt flow index* [g/10 min] |
|---|---|---|
| 0 | — | 2.5 |
| 0.2 | 72 | 3.0 |
| 0.4 | 55 | 3.8 |
| 0.6 | 38 | 4.1 |
| 1.0 | 22 | 4.6 |

*at 230° C. and 2.16 kg, in accordance with DIN 53 735

The grafted propylene polymers of Comparison Example A were not completely free of volatile substances.

From a comparison between Example 1 according to the invention and Comparison Example A, it is clear that higher graft yields can be achieved by use of the monomaleimide compounds as graft comonomers than with other graft comonomers.

Example 2

100 parts by weight of a polymer $a_2$) comprising 62.5% by weight of a propylene homopolymer and 37.5% by weight of a propylene copolymer containing 24.9% by weight of copolymerized ethylene and having a melt flow index of 2.3 g/10 min, at 230° C. and 2.16 kg, in accordance with DIN 53 735 were reacted with 4-maleimidobenzoic acid in a "ZSK 40" double screw extruder from Werner & Pfleiderer. The reaction was carried out at 240° C., 0.1 bar and with an average residence time of 2 minutes. The respective amounts of 4-maleimidobenzoic acid used are shown in Table 3 below.

The grafted propylene polymers obtained here are colorless and odorless and, compared with the polymer $a_2$) employed, have nearly unchanged fluidities. The grafted propylene polymers were then reprecipitated from a mixture of ethylbenzene and methanol. In the case of graft copolymers containing acidic groups, the graft yield was determined by titration with potassium hydroxide solution in xylene, otherwise by infrared spectroscopy.

TABLE 3

| Amount of 4-maleimidobenzoic acid employed [parts by weight] | Graft yield [%] | Melt flow index* [g/10 min] |
|---|---|---|
| 0 | — | 2.5 |
| 0.2 | 96 | 3.0 |

TABLE 3-continued

| Amount of 4-maleimidobenzoic acid employed [parts by weight] | Graft yield [%] | Melt flow index* [g/10 min] |
|---|---|---|
| 0.4 | 88 | 3.6 |
| 0.6 | 78 | 4.1 |
| 1.0 | 65 | 4.0 |

*) at 230° C. and 2.16 kg, in accordance with DIN 53 735

Example 3

100 parts by weight of the polymer $a_2$) used in Example 2 were reacted with a maleimide compound under the same conditions, the corresponding amount of N,N'-dimethylamino-4-maleimidobenzene being used instead of 4-maleimidobenzoic acid.

The grafted propylene polymers obtained here are colorless and odorless and, compared with the polymer $a_2$) employed, have nearly unchanged fluidities. The grafted propylene polymers are worked up and measured in a similar manner to Example 2.

TABLE 4

| Amount of 4-monomaleimide employed [parts by weight] | Graft yield [%] | Melt flow index* [g/10 min] |
|---|---|---|
| 0 | — | 2.5 |
| 0.2 | 95 | 3.1 |
| 0.4 | 80 | 3.2 |
| 0.6 | 71 | 3.5 |
| 1.0 | 60 | 4.1 |

*) at 230° C. and 2.16 kg, in accordance with DIN 53 735

Comparison Example B 100 parts by weight of the polymer $a_2$) employed in Example 2 were grafted under similar conditions, the corresponding amount of maleic anhydride being used instead of 4-maleimidobenzoic acid. The grafted propylene polymers were worked up and measured in a similar manner to Example 2.

TABLE 5

| Amount of maleic anhydride employed [parts by weight] | Graft yield [%] | Melt flow index* [g/10 min] |
|---|---|---|
| 0 | — | 2.5 |
| 0.2 | 75 | 3.0 |
| 0.4 | 50 | 3.8 |
| 0.6 | 36 | 4.1 |
| 1.0 | 22 | 4.6 |

*) at 230° C. and 2.16 kg, in accordance with DIN 53 735

The grafted propylene polymers of Comparison Example B were not completely free of volatile substances.

Comparison Example C 100 parts by weight of the polymer $a_2$) employed in Example 2 were grafted under similar conditions, n-butyl maleate now being used as the graft comonomer. The grafted propylene polymers were worked up and measured in a similar manner to Example 2.

TABLE 6

| Amount of n-butyl maleate employed [parts by weight] | Graft yield [%] | Melt flow index* [g/10 min] |
|---|---|---|
| 0 | — | 2.5 |
| 0.2 | 30 | 2.6 |
| 0.4 | 22 | 2.8 |
| 0.6 | 15 | 3.6 |
| 1.0 | 10 | 3.5 |

*) at 230° C. and 2.16 kg, in accordance with DIN 53 735

The grafted propylene polymers of Comparison Example C were not completely free of volatile substances.

From a comparison between Examples 2 and 3 according to the invention and Comparison Examples B and C, it is clear that higher graft yields can be achieved by use of the monomaleimide compounds as graft comonomers than with other graft comonomers.

We claim:

1. A grafted propylene copolymer having a melt flow index of from 0.1 to 100 g/10 min, at 230° C. and under a weight of 2.16 kg, comprising $a_1$) a polymer comprising from 25 to 97% by weight of a propylene copolymer (I), which contains from 0.1 to 15% by weight of copolymerized $C_2$-$C_{10}$-alk-1-enes, and from 3 to 75% by weight of a further propylene copolymer (II) which contains from 15 to 80% by weight of copolymerized $C_2$-$C_{10}$-alk-1-enes, or comprising $a_2$) a polymer comprising from 25 to 97% by weight of a propylene homopolymer and from 3 to 75% by weight of a propylene copolymer containing copolymerized $C_2$-$C_{10}$-alk-1-enes, the comonomer content being from 15 to 80% by weight, based on the latter component, and b) a monomaleimide compound of the following formula (I)

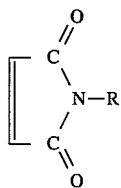

where R has the following meanings:

$C_1$-$C_{10}$-alkyl, $C_1$-$C_{10}$-alkyl interrupted by one or more oxygen atoms, $C_5$-$C_{10}$-cycloalkyl, $C_6$-$C_{12}$-aryl, $C_7$-$C_{18}$-aralkyl, and a radical of the following formula $$R^1\text{-}X \quad \text{(II)}$$

where $R^1$ is a $C_1$-$C_{10}$-alkyl radical and X is one of the following functional groups:

-COOH, -COOR², OH, OR³, NH₂, NHR⁴, NR⁵R⁶ and where the radicals $R^2$, $R^3$, $R^4$, $R^5$ and $R^6$ in each case are $C_1$-$C_{10}$-alkyl groups, obtainable by reacting the polymer $a_1$) or $a_2$) with the monomaleimide compound b) at from 180° to 280° C. and from 1 to 100 bar and with average residence times of the reaction mixture of from 0.2 to 10 minutes.

2. A grafted propylene copolymer as defined in claim 1, the polymer $a_1$) being used.

3. A grafted propylene copolymer as defined in claim 1, the polymer $a_2$) being used.

4. A grafted propylene copolymer as defined in claim 2, the polymer $a_1$) comprising from 35 to 95% by weight of a propylene copolymer (I), containing from 0.2 to 12% by weight of copolymerized $C_2$-$C_{10}$-alk-1-enes, and from 5 to 65% by weight of a propylene copolymer (II) containing from 20 to 75% by weight of copolymerized $C_2$-$C_{10}$-alk-1-enes.

5. A grafted propylene copolymer as defined in claim 3, the polymer $a_2$) comprising from 35 to 95% by weight of a propylene homopolymer and from 5 to 65% by weight of a propylene copolymer and the comonomer content being from 20 to 75% by weight, based on the latter component.

6. A grafted propylene copolymer as defined in claim 1, from 0.001 to 5 parts by weight of the monomaleimide compound b) being used per 100 parts by weight of the polymer $a_1$) or $a_2$).

7. A grafted propylene copolymer as defined in claim 1, the monomaleimide compounds b) used being compounds of the formula (I) where R has the following meanings:

$C_1$-$C_8$-alkyl, $C_5$-$C_7$-cycloalkyl, $C_6$-$C_{10}$-aryl, $C_7$-$C_{12}$-aralkyl, and a radical of the formula (II), $R^1$ being a $C_1$-$C_{10}$-alkyl radical and X being one of the following functional groups:

-COOH, COOR², OH, OR³, NH₂, - NHR⁴, NR⁵R⁶, and the radicals $R^2$, $R^3$, $R^4$, $R^5$ and $R^6$ in each case being $C_1$-$C_{10}$-alkyl groups.

8. A grafted propylene copolymer as defined in claim 1, the monomaleimide compound b) used being 4-maleimidobenzoic acid, N,N'-dimethylamino-4-maleimidobenzene or p-hydroxyphenylmaleimide.

9. A film, fiber or molded article made from the grafted propylene polymers as claimed in claim 1.

* * * * *

UNITED STATES PATENT AND TRADEMARK OFFICE
CERTIFICATE OF CORRECTION

PATENT NO.: 5,466,753

DATED: November 14, 1995

INVENTOR(S): MARCZINKE et al.

It is certified that error appears in the above-identified patent and that said Letters Patent is hereby corrected as shown below:

Column 12, claim 1, line 10, "obtainable" should read --obtained--.

Signed and Sealed this

Twenty-seventh Day of February, 1996

Attest:

BRUCE LEHMAN

Attesting Officer

Commissioner of Patents and Trademarks